United States Patent Office 3,451,449
Patented June 24, 1969

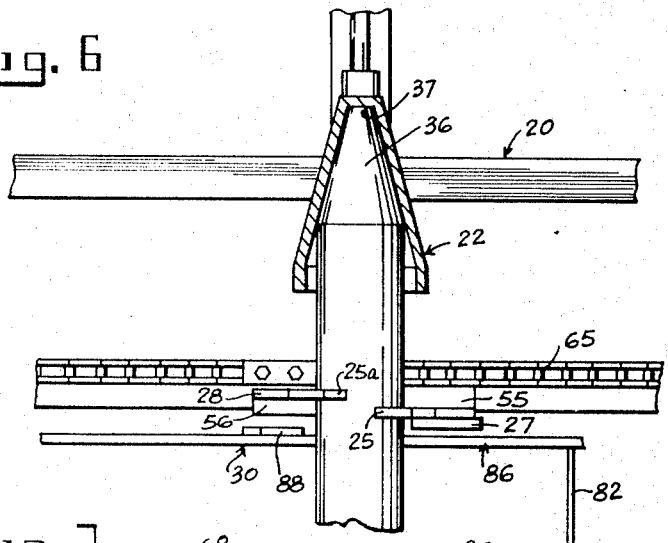
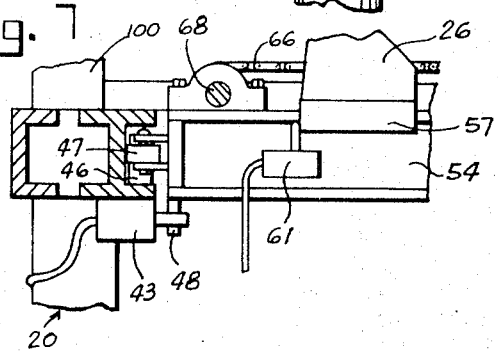
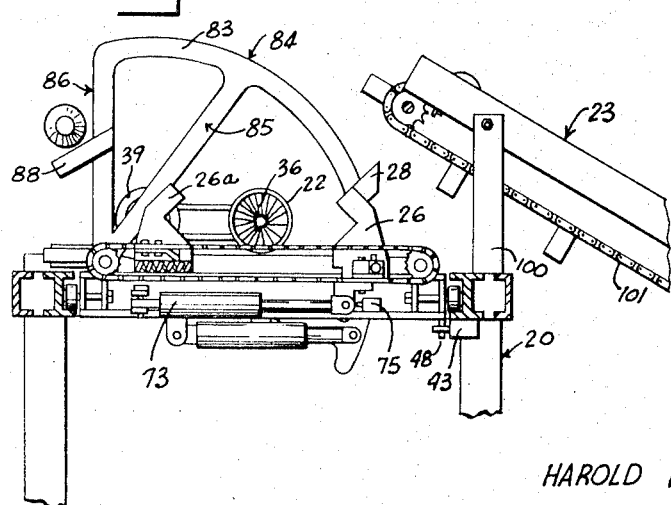
INVENTOR.
HAROLD BOUMA
ATTYS.

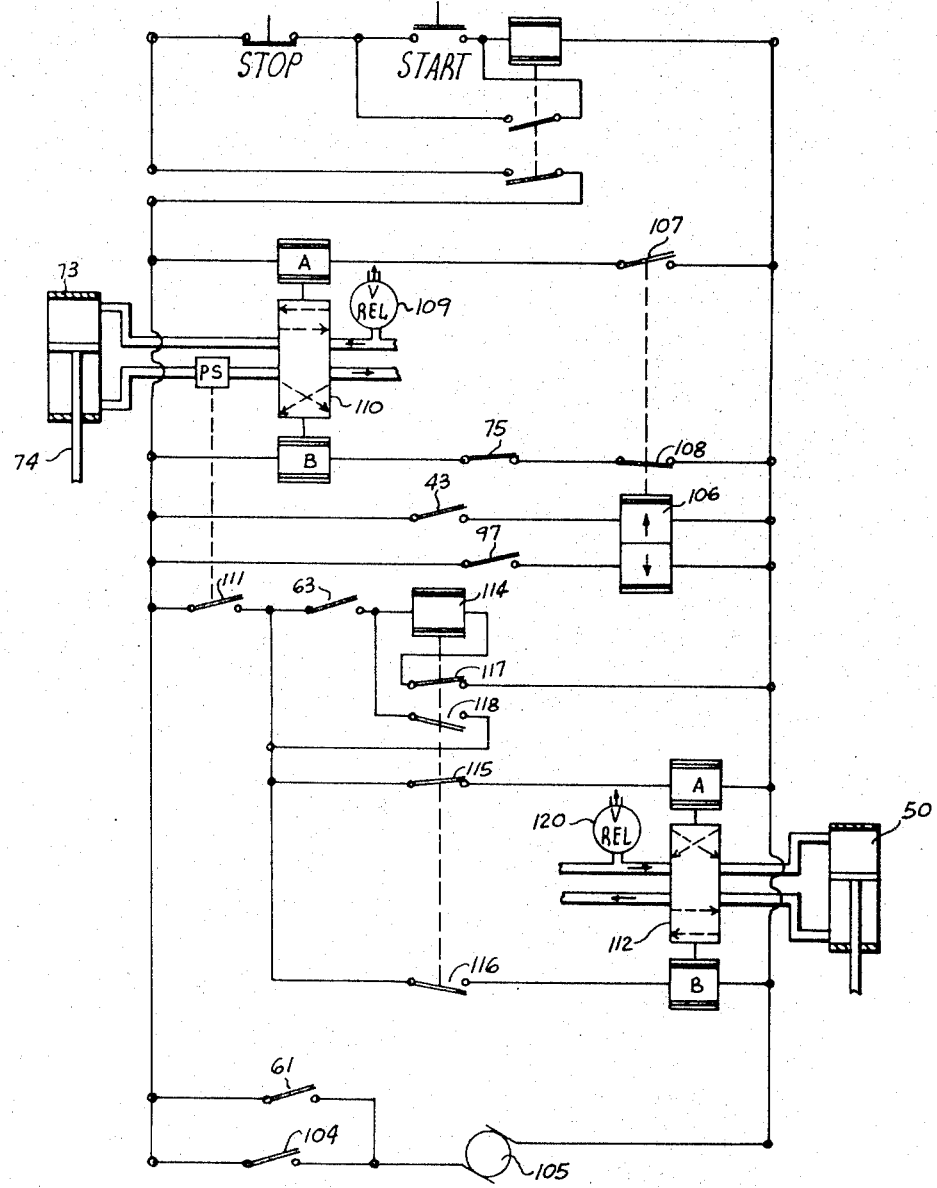

3,451,449
POST POINTING AND CAPPING APPARATUS
Harold Bouma, Choteau, Mont., assignor to Bouma Post Yards, Choteau, Mont., a corporation of Montana
Filed Feb. 6, 1967, Ser. No. 614,257
Int. Cl. B27m *3/32*
U.S. Cl. 144—30      15 Claims

ABSTRACT OF THE DISCLOSURE

The patent disclosure describes an embodiment of my invention concerning an apparatus for pointing and capping the ends of posts comprising a base frame with two opposed trimming devices mounted at the ends of the base frame and centered along a longitudinal axis. A reciprocating carriage is mounted on the base frame for movement between the trimming devices. Opposed jaws are reciprocally mounted on the carriage transversely and co-axially to the longitudinal axis. Inclined guides are mounted on the carriage for movement with jaws. A guide and transfer frame is rotatably mounted on the carriage, in cooperation with the inclined guides, for guiding posts received from a conveyor toward the longitudinal axis and between the jaws to be secured and aligned to the carriage along the longitudinal axis.

---

My invention relates to woodworking machinery and more particularly to machinery for pointing and capping the ends of posts, stakes, poles or the like.

It has been found that farmers and ranchers are able to construct stronger fences in a considerably shorter period of time by driving pointed posts into the ground than by digging post holes and placing blunt posts therein. Consequently, there has been a need for a machine that could economically and efficiently point one end and cap the other end of posts. It has been particularly difficult to construct such a machine that could economically and efficiently handle posts that have a wide variance of diameters and to cap each post uniform with a truncated conical surface.

Accordingly, one of the principal objects of my invention is to provide an apparatus for pointing and capping posts that is efficient in operation, simple in construction, and economical to manufacture.

An additional object of my invention is to provide an apparatus for pointing and capping posts capable of handling various diameter posts and for uniformly capping such posts.

A further object of my invention is to provide an apparatus having a novel post handling device for receiving posts from the conveyor and efficiently and accurately positioning the posts along a longitudinal axis between post trimming devices and for ejecting the post from the conveyor after the posts have been pointed and capped.

Other objects and advantages of my invention become apparent by reference to the following detailed description and the accompanying drawings illustrating a preferred embodiment of my invention in which:

FIGURE 6 is a detailed fragmentary view showing a post being shaped by a pointing device;

FIGURE 7 is a cross sectional view taken along line 7—7 of FIGURE 1 showing an abutment extending from the carriage for engaging a switch mounted to a base frame;

FIGURE 8 is a cross sectional view similar to FIGURE 2 showing the guide and transfer frame in the up position ejecting a pointed post;

FIGURE 9 is a schematic view of the hydraulic and electrical systems to control the pointing and capping apparatus.

Figure 1:
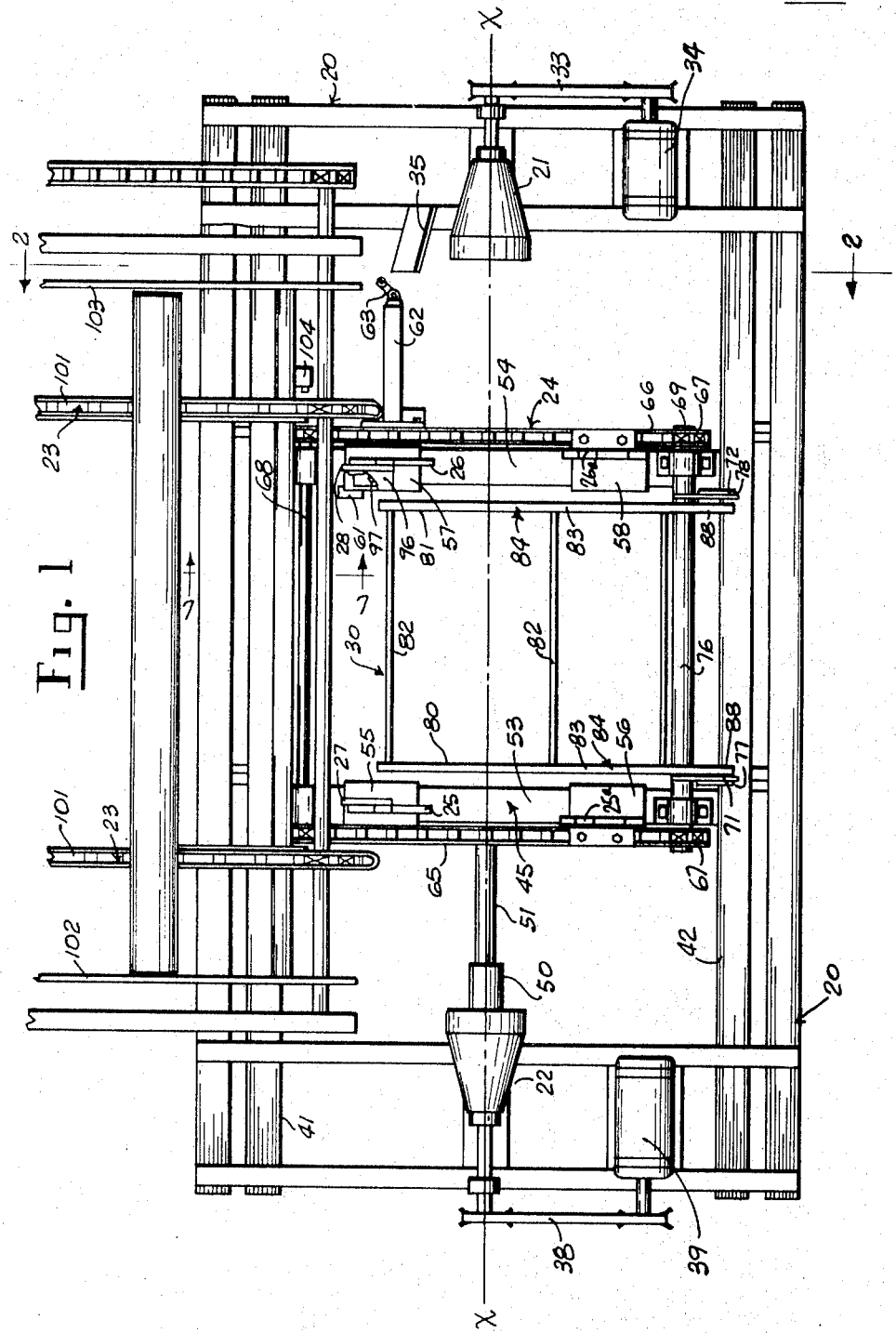
FIGURE 1 is a plan view of the pointing and capping apparatus showing in the principal features of an embodiment of my invention.

Referring now in detail to the drawings, there is illustrated in FIGURE 1 a pointing and capping apparatus having a base frame 20 with two opposed trimming devices 21 and 22 mounted at the ends of the base frame 20 and centered along a longitudinal axis X. Trimming device 21 is a capping device and trimming device 22 is a pointing device. A conveyor 23 is positioned laterally from the longitudinal axis X for feeding posts successively onto a carriage 24. Two sets of jaws 25 and 25a, and 26 and 26a are reciprocably mounted on the carriage 24 transversely to the longitudinal axis X. Inclined guides 27 and 28 are mounted on the carriage 24 and attached to the jaws 25 and 26. A guide and transfer frame 31 is rotatably mounted on the carriage for receiving posts from the conveyor 23 and moving the posts along the inclined guides 27 and 28 transversely toward the longitudinal axis X and between the jaws 25, 25a, and 26 and 26a. The jaws in turn secure and align the post to the carriage 24 along the axis X.

The capping device 21 is mounted at one end of the base frame 20 for forming a truncated conical surface on one end of the post to facilitate the operation of a post driving machine to drive a pointed post in the ground. The capping device 21 comprises a conical blade set 31 that is rotatably mounted to the base frame 20. An abutment 32 is positioned in the blade set 31 near the theoretical conical apex of the blade set 31. The blade set 31 is rotated by a belt 33 driven by a motor 34. A switch actuating plate 35 is adjustably mounted to the base frame 20 adjacent the capping device 21. The plate 35 is mounted at a desired acute angle to the axis X that corresponds approximately to the inclination of the conical blade set 31.

Pointing device 22 is mounted on the other end of the base frame 20 for forming a conical surface on the other end of the posts to facilitate the entrance of the posts into the ground. The pointing device 22 comprises a conical blade set 36 rotatably mounted on the base frame 20. An abutment 37 is positioned in the blade set 36 near the theoretical conical apex of the blade set 36. The conical blade set 36 is rotated by a belt 38 driven by a motor 39.

Longitudinal ways 41 and 42 are mounted on the base frame 20 parallel to the longitudinal axis X for guiding and supporting the carriage 24. A limit switch 43 (FIG. 7) is mounted beneath the longitudinal way 41 approximately midway between the capping and pointing devices.

The carriage 24 comprises a carriage frame 45 having supporting bearings 46 and aligning bearings 47 engaging the longitudinal ways 41 and 42. An actuating arm 48 is mounted beneath the carriage frame 45 for engagement with the limit switch 43 as the carriage 24 moves thereby.

The carriage 24 is reciprocated between the capping device 21 and the pointing device 22 by a hydraulic cylinder 50 mounted to the base frame 20 with a connecting rod 51 attached to the carriage frame 45.

The carriage frame 45 has cross ways 53 and 54. Jaws 25, 25a, 26 and 26a are affixed to bearing shoes 55, 56, 57 and 58 respectively. The bearing shoes 55 and 56 are slidably mounted on the cross way 53 and the bearing shoes 57 and 58 are slidably mounted on the cross way 54. Each bearing shoe has a spring assembly 60 attached thereto for enabling the jaws to be self-centering and for applying a uniform grip to the posts.

A limit switch 61 is mounted on the inside cross way 54 for engagement with bearing shoe 57 as the jaws move outwardly from the axis X (FIG. 1). A mount 62 is adjustably attached to bearing shoe 57 and extends toward the capping device 21 parallel to the longitudinal axis X. A limit switch 63 is attached to the mount for engaging the inclined actuating plate 35 as the carriage advances toward the capping device 21.

The jaws 25, 25a, 26 and 26a are reciprocated by chains 65 and 66. Bearing shoe 55 is resiliently connected to the lower run of the chain 65 and bearing shoe 56 is resiliently connected to the upper run of the chain 65. Bearing shoe 57 is resiliently connected to the lower run of chain 66 and bearing shoe 58 is resiliently connected to the upper run of chain 66. Chains 65 and 66 are supported between sprockets 67. The sprockets 67 are mounted on the ends of shafts 68 and 69 that are rotatably mounted on the carriage frame 45 parallel to the longitudinal axis X. Radial arms 71 and 72 are fixed to the ends of shaft 69 for arcuate movement therewith. The chains 65 and 66 are driven by a hydraulic cylinder 73 mounted to the carriage frame 45 and having a connecting rod 74 attached to the lower run of chain 65.

A limit switch 75 is mounted on the outside of cross way 54 substantially opposite switch 61 with its actuating arm extending into the path of the end of the rod 74. The switch 75 is set to open the electrical contacts when the rod 74 is fully extended.

The guide and transfer frame 30 has a pipe axle 76 that is rotatably mounted coaxially about shaft 69. Abutments or flanges 77 and 78 extend from the axle 76 and project into the arcuate paths of the radial arms 71 and 72 respectively. When the guide and transfer frame 30 is in an elevated position, the weight of the frame 30 tends to rotate the frame downwardly to move the flanges 77 and 78 against the radial arms 71 and 72 respectively.

The guide and transfer frame 30 further comprises two sectors 80 and 81 that extend radially from the axle 76 and are spaced transversely along the longitudinal axis X by spacing members 82. Each sector has a ring 83 along its outer periphery in which the radial distance from the ring 83 to the axle 76 is gradually reduced there along forming an eccentrical surface 84. The rings 83 are supported by spokes 85 extending from the axle 76. The upper spokes have radial surfaces 86 thereon for guiding a post into the jaws. The eccentrical surfaces 84 communicate with the radial surfaces 86 at pivots 87. Stops 88 project from the upper spokes to stop the lateral movement of a post as it moves along the radial surfaces 86.

The inclined guide 28 has a flexible member 96 that engages a limit switch 97 mounted to the inclined guide 28. As a post moves onto the inclined guide 28 the flexible member 96 is depressed to actuate the switch 97.

The conveyor 23 is supported by brackets 100 to the base frame 20. The conveyor comprises chains 101 that successively move posts laterally toward the longitudinal axis X and onto the carriage 24. Sides 102 and 103 are mounted transversely to the axis X to longitudinally position the posts on the chains 100. A limit switch 104 is positioned near the front of the conveyor and is actuated by the movement of a post moving along the conveyor 23.

Figure 2:
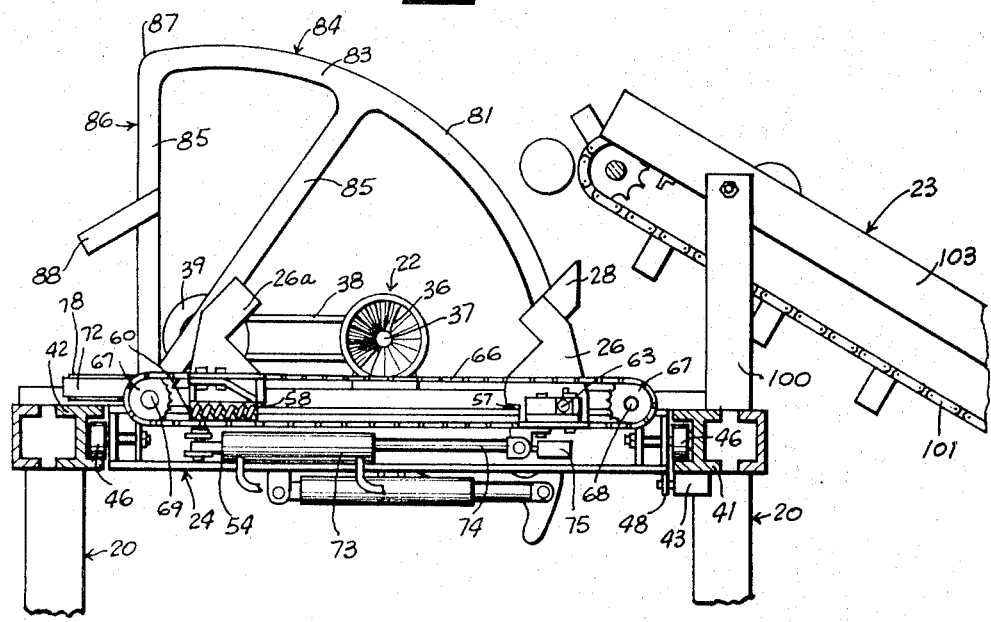
FIGURE 2 is a cross sectional view taken along line 2—2 of FIGURE 1 showing a guide and transfer frame and inclined guides mounted on a reciprocating carriage between a capping device and a pointing device for receiving a post from a conveyor.

In operation, posts are fed along the conveyor 23 toward the longitudinal axis X. As a post approaches the front of the conveyor, it opens the switch 104 to stop the conveyor 105 (FIG. 9) to hold the post from moving onto the carriage 24. Initially, as shown in FIG. 2, the jaws 25, 25a, 26 and 26a and the inclined guides 27 and 28 are retracted and the guide and transfer frame 30 is elevated.

Figure 3:
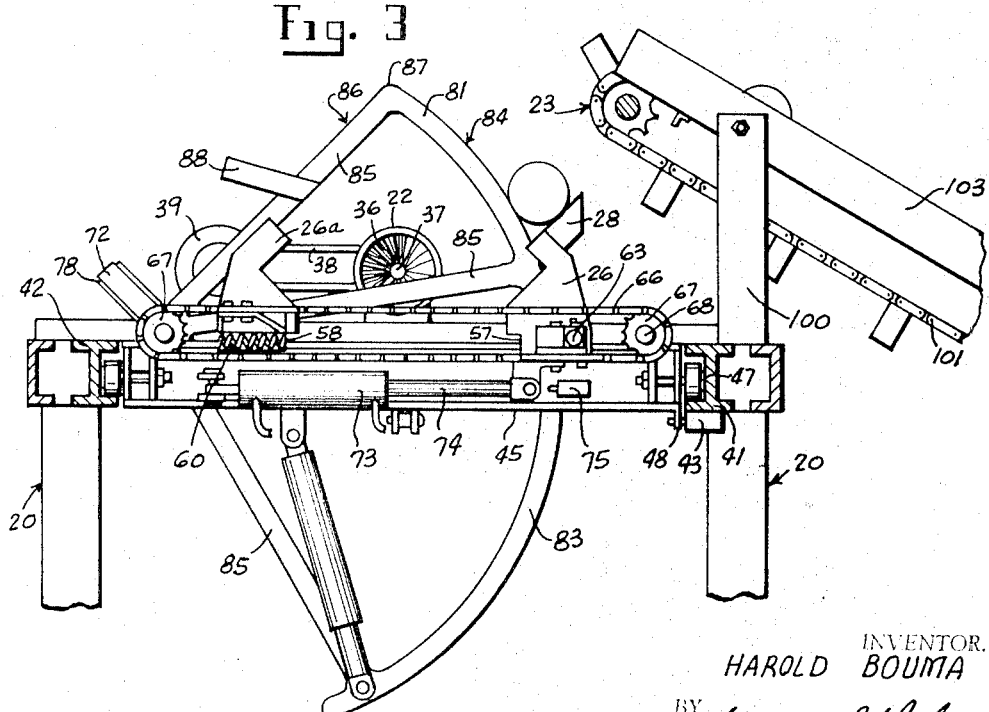
FIGURE 3 is similar to FIGURE 2 except the frame is shown in an intermediate position with the post being guided by the inclined guides and eccentrical surface of the frame.

The bearing shoe 57 engages switch 61 to override switch 104 to start the conveyor motor 105 to feed a post onto the inclined guides 27 and 28 and against the eccentrical surfaces 84. As the post engages the inclined guide 28, it depresses the flexible member 96 and closes switch 97 to activate one side of a double coil pulse holding relay 106 to close contacts 107 and open contacts 108, thereby energizing the A solenoid of the double acting valve 110 to pressurize the hydraulic cylinder 73 to retract the rod 74. The rod rotates the shafts 68 and 69 in a first direction to move the chains 65 and 66 to in turn reciprocate the jaws 25, 25a, 26 and 26a and the inclined guides 27 and 28 toward the longitudinal axis X. As shaft 69 rotates in the first direction, the radial arms 71 and 72 rotate downwardly enabling the engaging flanges 77 and 78 to move therewith to lower the guide and transfer frame 30. As the frame 30 moves downwardly the receding eccentrical surfaces 84 are presented to the post for lowering the post along the inclined guides 27 and 28 toward axis S (FIG. 3).

When the points 87 move below the inclined guides 27 and 28, the radial surfaces 86 are presented as inclined surfaces to further guide the post into the inwardly moving jaws. The transfer frame continues to move downwardly until the radial surfaces 86 are in a horizontal plane.

Figure 4:
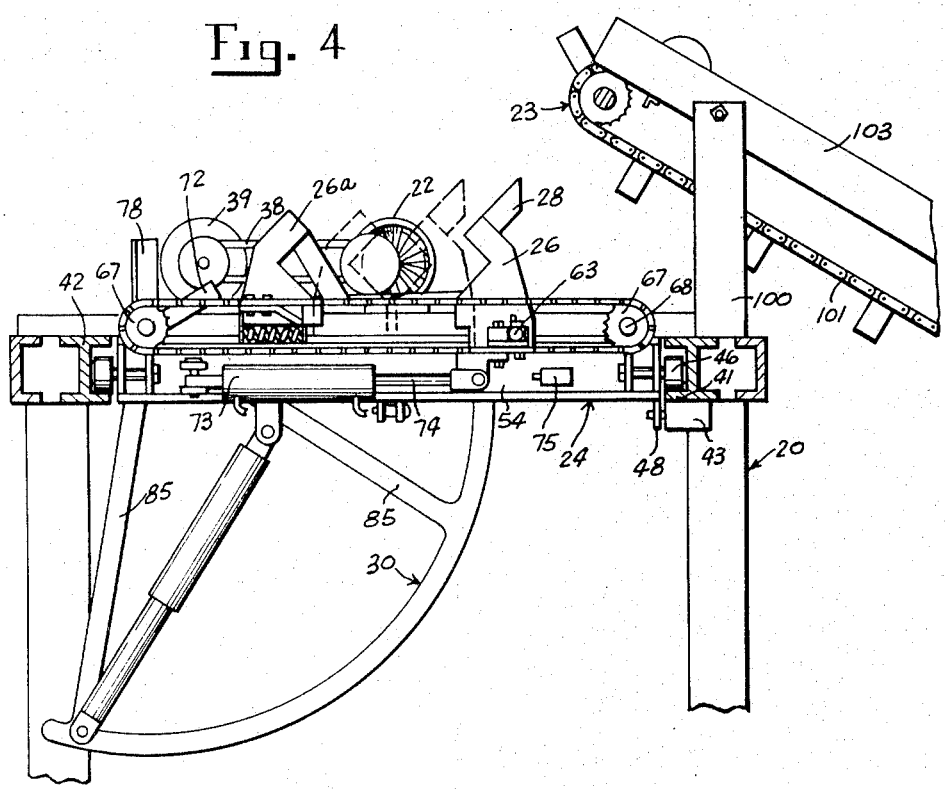
FIGURE 4 is similar to FIGURE 3 except the frame is shown in the down position and further showing in phantom jaws clamping the post along a longitudinal axis.

After the frame is in the down position and the post is between the jaws, the shafts 68 and 69 continue to rotate to disengage arms 71 and 72 from the flanges 77 and 78 in a lost motion movement and to move the jaws against the post secured and align the post to the carriage 24 along the longitudinal axis X (FIG. 4). As the jaws engage the post the hydraulic pressure in the hydraulic cylinder 73 rapidly increases. When the pressure reaches approximately 400 p.s.i., a pressure switch 111 is closed to energize the solenoid of the double acting valve 112 to pressure the hydraulic cylinder 50 to move the carriage toward the capping device. When the hydraulic pressure in cylinder 73 reaches 800 p.s.i., a relief mechanism 109 operates to limit the pressure of the jaws against the post. The spring assemblies 60 permit the jaws to adjust in a self-centering action to compensate for those posts that are not straight or symmetrical.

Figure 5:
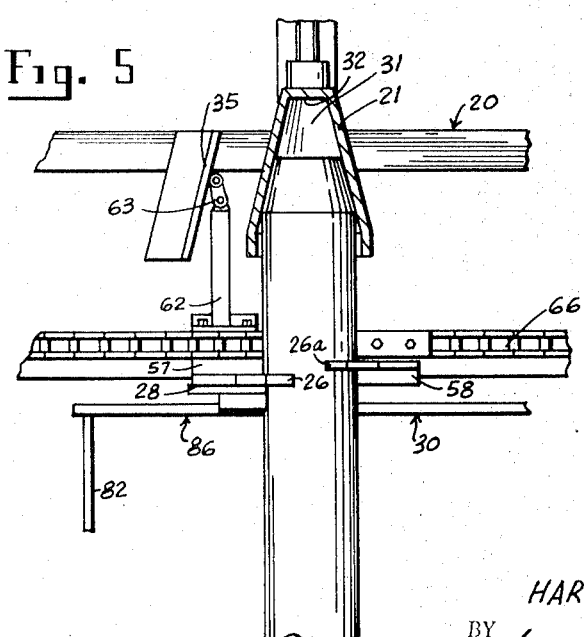
FIGURE 5 is a detailed fragmentary view showing a switch carried by the carriage engaging the inclined surface to regulate the advance of the carriage toward a capping device.

After the post moves into the capping device 21 a predetermined distance sufficient to form a truncated conical cap thereon, switch 63 engages the inclined plate 35 and is closed thereby (FIG. 5). The closing of switch 63 energizes relay 114 to instantaneously open contacts 115 and close contacts 116 to energize the B solenoid and deenergize the A solenoid valve 112 to reverse the hydraulic pressure in the cylinder 50 to move the carriage 24 from the capping device 21 toward the pointing device 22. Since switch 63 is interconnected and transversely movable with the jaw 26, the conical blade set 31 is able to cut a uniform beveled conical surface on the posts independently of the diameter of the posts. For example, if the post has a small diameter, the carriage 24 will move the post further into the conical blade set 31 before switch 63 engages and is activated by the plate 35.

The energizing of relay 114 operates to open time delay contacts 117 at the expiration of a preset period. The contacts 117 are preferably preset to open after the post is pointed. The energization of relay 114 also closes contacts 118 to hold the relay 114 energized after the switch 63 is opened as the carriage moves away from the capping device 21.

As the other post end moves into the pointing device 22 the rotating conical blade set 36 contours the post end forming a point. As the post continues into the conical blade set, the end of the post engages abutment 37 causing the pressure in the hydraulic cylinder 50 to increase rapidly. When the pressure reaches approximately 400 p.s.i., a relief mechanism 120 operates to limit the increase in pressure.

At the expiration of the present period, contacts 117 open to deenergize relay 114 to open contacts 116 and 118 and close contacts 115. The opening of contacts 116 and closing of contacts 115 activates the solenoid valve 112 to again reverse the hydraulic pressure in cylinder 50 to move the carriage from the pointing device 22 toward the capping device 21.

As the carriage 24 approaches the midpoint between the trimming device 21 and 22 the actuating arm 48 carried by the carriage frame 45 closes microswitch 43 mounted on the base frame 20.

Switch 43 energizes the other side of pulse relay 106 to open contacts 107 and close contacts 108. The closing of contacts 108 energizes the B solenoid of valve 110. The opening of contacts 107 deenergizes the A solenoid of valve 110. Valve 110 reverses the pressure in the cylinder 73.

When the pressure reverses, pressure switch 111 opens to deenergize relay 114 and the A solenoid of valve 112 to permit the valve 112 to assume its neutral position to equalize the pressure in cylinder 50 to stop the carriage midway between the capping and pointing devices 21 and 22.

The reversal of the hydraulic pressure in the hydraulic cylinder 73 also extends the connecting rod 74. The extension of connecting rod 74 rotates shafts 68 and 69 in a second direction to open the jaws 25, 25a, 26 and 26a. As shaft 69 begins to rotate in the second direction, radial arms 71 and 72 move in a substantial loss motion arc before engaging flanges 77 and 78. The loss motion enables the jaws to clear before the post is removed. As shaft 69 continues to rotate, arms 71 and 72 move against flanges 77 and 78 to move the frame upwardly. As the frame 30 moves upwardly, the radial surfaces 86 engage the pointed post and lifts the post from between the jaws. Continuing movement of the frame 30 ejects the post from the carriage 24 opposite the conveyor 23 and positions the surface 84 to receive an unworked post from the conveyor.

When the connecting rod 74 is fully extended, it engages and opens the limit switch 75 to deenergize the B solenoid of valve 110 enabling the valve 110 to move to the neutral position to neutralize the pressure in cylinder 73.

As the jaws reach their retracted positions, bearing shoe 57 engages switch 61 to operate the supply conveyor motor 105 to start a new cycle.

It is understood that the above described embodiment is simply illustrative of the application of the principles of my invention. Numerous other arrangements may be readily devised by those skilled in the art which will embody the principles of the invention and fall within the spirit and scope thereof.

What I claim is:

1. In an apparatus for automatically trimming post ends, comprising:
    (a) opposed post trimming devices centered along a longitudinal axis;
    (b) a post conveyor laterally spaced from the longitudinal axis for feeding posts successively parallel to the axis;
    (c) a reciprocating carriage mounted between the trimming devices along the longitudinal axis; and
    (d) post handling means mounted on the carriage for receiving the posts from the conveyor, guiding the posts laterally and securing and aligning the posts to the carriage along the longitudinal axis, said post handling means having:
    (1) opposed jaws reciprocally mounted on the carriage and coaxially transversely and coaxially to the longitudinal axis;
    (2) guides mounted on the carriage directed toward the longitudinal axis;
    (3) a movable guide and transfer frame for receiving the post from the conveyor and guiding the post along the guides laterally toward the longitudinal axis; and
    (4) drive means for moving the jaws and the guide and transfer frame to guide the posts from the conveyor into the moving jaws and to secure and align the posts to the carriage along the longitudinal axis.

2. The combination in accordance with claim 1 wherein the post handling means further releases and ejects the post from the carriage.

3. The combination in accordance with claim 1 wherein the movable guide and transfer frame is rotatable and has an eccentric surface for receiving the posts fed from the conveyor and for guiding the posts laterally toward the longitudinal axis.

4. The combination in accordance with claim 3 wherein the movable guide and transfer frame has a radial surface communicating with the eccentrical surface for guiding the post into the jaws and for removing the posts from between the jaws and ejecting the posts from the carriage.

5. The combination in accordance with claim 1 wherein the guide and transfer frame comprises:
    (a) an axle rotatably mounted parallel to the longitudinal axis;
    (b) an abutment radially mounted to the axle; and
    (c) spaced sectors radially mounted to the axle for movement in an arcuate path;
    each of said sectors having a eccentrical surface for receiving the posts fed from the conveyor and for guiding the posts along the inclined guides laterally toward the longitudinal axis.

6. The combination in accordance with claim 5 wherein each sector has a radial surface communicating with the eccentrical surface for guiding the posts to between the jaws and for removing the posts from the jaws and ejecting the posts from the carriage.

7. The combination in accordance with claim 6 wherein the drive means comprises:
    (a) opposed shafts rotatably mounted to the carriage parallel to the longitudinal axis;
    (b) an arm mounted to one of the said shafts for engagement with the frame abutments;
    (c) sprockets mounted on said shafts for rotating the shafts;
    (d) a contiuuous chain mounted on the sprockets between the shafts for rotating the sprockets with the lower run of the chains connected to one jaw and the upper run of the chain connected to the other jaw; and
    (e) a hydraulic actuator connected to the chain for moving the chain in a first direction to move the jaws and inclined guides toward the longitudinal axis and to rotate the shafts to move the arm to permit the frame to rotate downwardly in a curved path to guide the posts fed from the conveyor toward the longitudinal axis along the inclined guides and eccentrical surfaces and then along the radial sector surface into the jaws to be secured and aligned to the carriage along the longitudinal axis, and for moving the chain in a second direction to move the jaws and inclined guides from the longitudinal axis to release the posts and to reverse the shafts to move the arm against the abutment to rotate the frame upwardly to engage the release post with the radial surface to remove the posts from the jaws and to eject the posts from the carriage.

8. The combination in accordance with claim 6 further comprising a carriage drive means for reciprocating the carriage between the opposed trimming devices.

9. The combination in accordance with claim 8 wherein one of the trimming devices forms a truncated conical surface on one end of the post; said trimming device having a switch actuating plate mounted at an acute angle to the longitudinal axis; and wherein the carriage has a switch mounted thereon for movement with the jaws to engage the switch actuating plate as the carriage is advanced toward the said trimming device a predetermined distance to activate the carriage drive means to reverse the movement of the carriage.

10. In a post trimming apparatus, a post handling device, a reciprocating carriage that moves along a longitudinal axis for handling posts fed from a laterally spaced conveyor, said post handling device being mounted on said carriage to position the posts along the longitudinal axis means for trimming one end of the posts located on said axis, said posts handling device comprising:
(a) opposed jaws reciprocally mounted on a carriage transversely and coaxially to the longitudinal axis;
(b) inclined guides movable with the jaws adjacent the laterally spaced conveyor;
(c) a rotatable guide and transfer frame for receiving the posts from the conveyor and guiding the posts along the inclined guide toward the longitudinal axis; and
(d) drive means for moving the jaws and the inclined guides and rotating the frame to guide the posts laterally toward the longitudinal axis and to secure and align the posts to the carriage along the longitudinal axis.

11. The combination in accordance with claim 10 wherein the drive means move the jaws to release the posts and rotates the frame to eject the posts from the carriage.

12. The combination in accordance with claim 10 wherein the rotatable frame has an eccentrical surface for engaging the posts fed from the conveyor and for guiding the post laterally toward the longitudinal axis.

13. The combination in accordance with claim 12 wherein the rotatable frame has a radial surface communicating with the eccentrical surface for guiding the posts into the jaws.

14. The combination in accordance with claim 13 wherein the drive means first moves the jaws and inclined guide towards th longitudinal axis and rotates the frame in a first direction to guide the posts towards the longitudinal axis along the inclined guides and eccentrical surface and then along the radial surface into the jaws to secure and align the posts to the carriage along the longitudinal axis, and second, moves the jaws and inclined guides from the longitudinal axis to release the posts and rotate the frame in a second direction to eject the posts from the carriage.

15. The combination in accordance with claim 13 wherein the posts are ejected opposite the conveyor.

References Cited
UNITED STATES PATENTS

| | | | |
|---|---|---|---|
| 362,638 | 5/1887 | Laycock | 144—30 |
| 562,128 | 6/1896 | Frost | 144—30 |

DONALD R. SCHRAN, *Primary Examiner.*